United States Patent
Pandis et al.

(10) Patent No.: US 12,197,437 B2
(45) Date of Patent: *Jan. 14, 2025

(54) SELECTING BETWEEN HYDRATION-BASED SCANNING AND STATELESS SCALE-OUT SCANNING TO IMPROVE QUERY PERFORMANCE

(71) Applicant: Amazon Technologies, Inc., Seattle, WA (US)

(72) Inventors: Ippokratis Pandis, Menlo Park, CA (US); Matthew James Perron, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/171,245

(22) Filed: Feb. 17, 2023

(65) Prior Publication Data

US 2023/0195726 A1    Jun. 22, 2023

Related U.S. Application Data

(63) Continuation of application No. 17/489,532, filed on Sep. 29, 2021, now Pat. No. 11,593,367.

(51) Int. Cl.
*G06F 16/245* (2019.01)
*G06F 16/2453* (2019.01)

(52) U.S. Cl.
CPC .. *G06F 16/24537* (2019.01); *G06F 16/24539* (2019.01); *G06F 16/24542* (2019.01)

(58) Field of Classification Search
None
See application file for complete search history.

(56) References Cited

U.S. PATENT DOCUMENTS

| | | |
|---|---|---|
| 9,270,521 B2 | 2/2016 | Tompkins |
| 9,391,902 B2 | 7/2016 | Eliás |
| 10,223,417 B1 | 3/2019 | Sirin |

(Continued)

OTHER PUBLICATIONS

Le Pape, Cecile, et al: "Replica Refresh Strategies in a Database Cluster", High Performance Computing for Computational Science—VECPAR 2006: 7th International Conference, Rio de Janeiro, Brazil, Jun. 10-13, 2006, pp. 679-691, Revised Selected and Invited Papers 7, Springer Berlin Heidelberg, 2007.

(Continued)

*Primary Examiner* — Son T Hoang
(74) *Attorney, Agent, or Firm* — Robert C. Kowert; Kowert, Hood, Munyon, Rankin & Goetzel, P.C.

(57) ABSTRACT

When a query is received by a stateful data processing service, the service determines, for each table scan (and associated operations) of a query, whether to select the table scan for execution by a stateless data processing service. The selected table scans are sent to the stateless data processing service for execution, and results are received by the stateful data processing service. The stateful data processing service may also execute other table scans of the query locally, against a local data cache. If the data is not present in the local data cache, then the stateful data processing service will copy the table data into the local data cache before executing the table scan. A query result based on the remote and/or local table scans may then be returned to the client.

20 Claims, 9 Drawing Sheets

(56) References Cited

U.S. PATENT DOCUMENTS

| | | | |
|---|---|---|---|
| 10,229,158 B2 | 3/2019 | Belknap et al. | |
| 10,303,688 B1 | 5/2019 | Sirin | |
| 10,922,371 B2 | 2/2021 | Yi et al. | |
| 11,128,701 B1 | 9/2021 | Virtuoso et al. | |
| 11,593,367 B1 | 2/2023 | Pandis et al. | |
| 11,636,108 B1* | 4/2023 | Xu | G06F 16/256 |
| | | | 707/714 |
| 2004/0088063 A1* | 5/2004 | Hoshi | G06F 16/95 |
| 2006/0168084 A1* | 7/2006 | Kogan | G06F 16/27 |
| 2007/0050328 A1* | 3/2007 | Li | G06F 16/9032 |
| 2009/0228446 A1* | 9/2009 | Anzai | G06F 16/284 |
| 2010/0153436 A1* | 6/2010 | Teufel | G06F 16/951 |
| | | | 707/769 |
| 2011/0314019 A1 | 12/2011 | Jimenez Peris et al. | |
| 2015/0370858 A1 | 12/2015 | Lafuente Alvarez | |
| 2016/0294975 A1* | 10/2016 | Kemmler | G06F 16/27 |
| 2017/0116289 A1 | 4/2017 | Deshmukh et al. | |
| 2018/0075100 A1 | 3/2018 | Park et al. | |
| 2018/0075125 A1 | 3/2018 | Stiel et al. | |
| 2018/0203744 A1 | 7/2018 | Wiesmaier et al. | |
| 2018/0255135 A1 | 9/2018 | Hwang et al. | |
| 2019/0026200 A1* | 1/2019 | Austruy | G06F 16/24 |
| 2019/0384863 A1 | 12/2019 | Sirin | |
| 2020/0050694 A1 | 2/2020 | Avalani | |
| 2020/0067789 A1 | 2/2020 | Khuti et al. | |
| 2022/0253440 A1* | 8/2022 | Liu | G06F 16/24544 |

OTHER PUBLICATIONS

Gupta Anurag, et al, "Amazon Redshift and the Case for Simpler Data Warehouses", Proceedings of the 2015 ACM SIGMOD international conference on management of data (SIGMOD '15), pp. 1917-1923, May 27, 2015 , ACM Press, New York, New York, USA.

U.S. Appl. No. 17/535,940, filed Nov. 26, 2021, Ippokratis Pandis.
U.S. Appl. No. 17/535,446, filed Nov. 24, 2021, Ippokratis Pandis.
U.S. Appl. No. 17/547,831, filed Dec. 10, 2021, Gaurav Saxena, et al.

* cited by examiner

SELECTING BETWEEN HYDRATION-BASED SCANNING AND STATELESS SCALE-OUT SCANNING TO IMPROVE QUERY PERFORMANCE

This application is a continuation of U.S. patent application Ser. No. 14/489,532, filed Sep. 29, 2021, which is hereby incorporated by reference herein in its entirety.

BACKGROUND

As the technological capacity for organizations to create, track, and retain information continues to grow, a variety of different technologies for managing and storing large amounts of data have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data processing.

Data processing is often measured by the speed at which requests to access data are performed. Different techniques for accessing data may result in different data retrieval times, depending on the type of access query and/or the location of data to be accessed. For example, some types of data access requests require intensive computational and storage access workloads, while other types of data access requests may only involve small amounts of work to process. A particular data processing service may be able to perform certain parts of a query (e.g., a table scan) faster than another data processing service. However, a different data processing service may be able to perform other parts of the query faster, due to different techniques and/or architecture used by the different data processing service. Furthermore, the query performance that may be achieved by a given data processing service may change, depending on factors such as the amount of data cached by the service at a given time.

Figure 1:
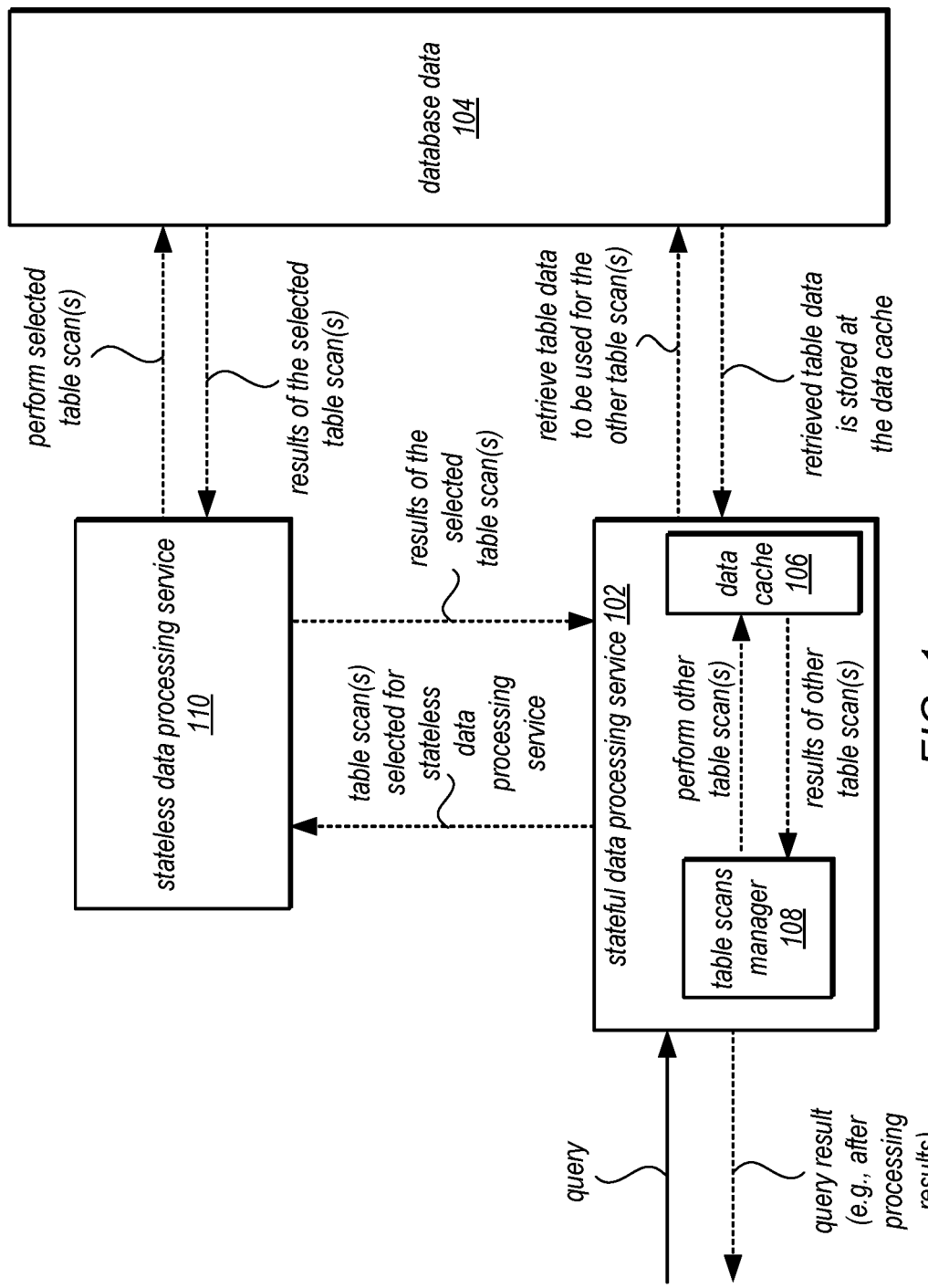
FIG. 1 illustrates a logical block diagram of selecting between hydration-based scanning and stateless scale-out scanning to improve query performance, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in various embodiments to implement selecting between hydration-based scanning and stateless scale-out scanning to improve query performance. In embodiments, the ability to dynamically select different data retrieval techniques for different operations (e.g., table scans and associated operations) of a database query may improve the performance (e.g., reduce retrieval time of data/query results), compared to traditional querying techniques.

The ability to rapidly scale hardware resources according to client/user demand is one of the advantages of using "cloud" systems (e.g., provider networks). Yet for data processing services offered by a provider network that may have a large amount of client data cached on local disks and/or in memory, adjusting cluster sizes may result in a penalty to query performance. This is often due to the time/cost of warming local disk and/or memory caches from "cold" cloud storage services. This "cold start" performance degradation may limit a system's ability to deliver fast performance when hardware resources change. Therefore, clients may be discouraged from pausing or adjusting the size of their cluster, in order to avoid the performance penalty of a cold start.

In a "serverless" context (e.g., a scalable service that may instantiate new instances to scale up for an increased workload), the provider network makes provisioning decisions based on an input workload. To provide good performance to the client/customer, a cloud provider may keep warmed nodes active during periods of inactivity. However, the cloud provider must keep idle workers running in order to deliver good performance to the user when queries resume, resulting in additional costs. Keeping idle nodes active indefinitely may be infeasibly expensive, and the associated machines will eventually be shut down. When the next query arrives, the user will see the cold start query performance, which may be far below the query performance when caches are warm. Therefore, the cloud provider may be forced to play a balancing act between cost and delivering high query performance to its clients. In embodiments, if cold start performance matched (or was close to) warm performance, then the cost associated with resizing or pausing clusters may be greatly reduced.

In various embodiments, by leveraging a large multi-tenant stateless cluster shared among any number of clients, the gap between cold start and warm performance may be significantly decreases. Dedicated clusters of a "stateful" data processing service may delegate certain table scans (and associated query operations, such as aggregations, filtering, projection, etc.) to a cluster of a "stateless" scalable data processing service if the data resides in a shared storage location. In embodiments, the stateful service may hydrate (e.g., copy) table data to a local data cache and execute scans on the client's cluster, or delegate the table scan operation to execute on the shared "stateless" scalable data processing fleet, sending the results to the user's stateful cluster. With the stateless scalable data processing fleet, the client/user may gain access to massive aggregate bandwidth not present on their dedicated cluster. Therefore, executing a scan using the stateless scalable data processing service may be significantly faster than rehydrating data to the client's cluster.

In embodiments, by using a combination of stateless and stateful models of analytical query processing, the elasticity of stateless processing may be obtained, along with the performance of dedicated stateful cluster. By using a combination of user dedicated stateful clusters with data cached on local disks of a data cache and the stateless multi-tenant scalable cluster, users may obtain the performance of locally cached data, but on cold start, may take advantage of the high network throughput and vast compute resources of the stateless scalable cluster. This may ameliorate the cold start issue, pushing cold start performance significantly closer to warm performance (and in some cases, match or exceed warm performance). In various embodiments, using a stateless scalable data processing service to improve cold start performance when a cluster is restarted or resized provides users the performance of a warm cluster while retaining the elasticity of a scalable service. In various embodiments, a "table scan" may refer to the table scan operation as well as the associated query operations that are performed on the data from the table scan (e.g., filtering, projection, aggregation, partial aggregation and/or any other type of query operation that may be specified for a table scan). Therefore, the phrase "table scan," in embodiments, may be considered to represent a table scan and associated operations for the table scan.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 9 and described below.

This specification begins with a description of a system for selecting between hydration-based scanning and stateless scale-out scanning to improve query performance. A number of different methods and techniques to implement selecting between hydration-based scanning and stateless scale-out scanning to improve query performance, some of which are illustrated in accompanying flowcharts. Finally, a description of an example computing system upon which the various components, modules, systems, and/or techniques described herein may be implemented is provided. Various examples are provided throughout the specification.

FIG. 1 illustrates a logical block diagram of selecting between hydration-based scanning and stateless scale-out scanning to improve query performance, according to some embodiments. Stateful data processing service 102 may be a query processing service, application, or system of one or multiple components (e.g., a processing cluster as discussed below that includes one or multiple processing nodes or a single node query engine) that can perform queries, such as a query to a database, by accessing database data 104, in some embodiments.

At least a portion of database data 104 may be stored or co-located with the stateful data processing service 102 in some embodiments (e.g., in attached storage as described below in FIG. 5) or may be a separate data store (e.g., network attached storage and/or a separate storage service), in some embodiments. As shown, the stateful data processing service 102 include a data cache 106 that may store data from any number of tables stored in database data 104. Also shown is a table scans manager 108, which may select and route at least some table scan(s) of a query to a stateless data processing service 110 for processing and/or perform other (remaining) table scan(s) of the query locally on the data cache 106. Although a table scan is discussed herein, in various embodiments, the table scans manager 108 may handle any other type of database operation of a query in the same or similar manner (e.g., selecting the operation, routing the operation, performing the operation locally, etc.). Database data 104 may be stored for various types of databases to which queries may be performed (e.g., relational, non-relational, NoSQL, document, graph, etc.), in some embodiments. FIGS. 3-6, for instance, discuss a data warehouse style database that stores database data, as well as other data stores, such as object-based storage service 330 (which may be general data stores which store data in other types or formats of data in addition to database data.)

In some embodiments, a stateless data processing service 110 may perform any number of table scans of the query. The stateless data processing service 110 may be a scalable and/or stateless query processing service, application, or system of one or multiple components (e.g., including any number of processing nodes) that can perform queries, such as a query to a database, by accessing database data 104, in some embodiments.

The stateful data processing service 102 (e.g., the table scans manager 108) may implement selecting between hydration-based scanning and stateless scale-out scanning to improve query performance. In the example embodiment, the table scans manager 108 of the stateful data processing service 102 receives a query from a client (e.g., from one of any number of different clients of the stateful data processing service). The query may indicate/include any number of table scans to be performed on a plurality of tables of the database. The stateful data processing service 102 may select, based on any number of criteria, one or more table scans from among any number of table scans indicated by the query. The stateful data processing service 102 may then send an indication of the one or more selected table scans to the stateless data processing service 110.

In embodiments, for any given table scan indicated by the query, the stateful data processing service 102 may determine whether an amount of time to perform the table scan by the stateless data processing service 110 will be less than (e.g., is predicted/estimated to be less than, based on meeting the one or more criteria) an amount of time to perform the table scan by the stateful data processing service 102. If the stateful data processing service 102 determines that the amount of time to perform the table scan by the stateless data processing service 110 will be less, then the stateful data processing service 102 will select the table scan as one of the table scans of the query to be performed by the stateless data processing service 110 instead of the stateful data processing service 102.

In various embodiments, the stateful data processing service 102 may determine whether any number of criteria have been met for a given table scan in order for the stateful data processing service 102 to select the table scan as one of the table scans to be processed by the stateless data processing service 110. In embodiments, to select the table scan, the stateful data processing service 102 may determine that a size of a table to be scanned by the table scan is above a threshold size and/or a number of requests to be made by the stateless data processing service to perform the table scan is above a threshold number (e.g., requests submitted to the database concurrently/in parallel). In embodiments, it may be the case that scans directed to relatively large tables may be processed faster by the stateless data processing service 110 than the stateful service. In some embodiments, if the stateless data processing service makes a larger number of parallel requests, then it will process a table scan faster than if it uses a smaller number of requests.

The stateful data processing service 102 may determine whether any number of other criteria have been met for a given table scan in order to select the table scan as one of the table scans to be processed by the stateless data processing service 110. For example, the stateful data processing service 102 may determine that no data of the table to be scanned by the table scan is stored by the stateful data processing service (e.g., in the data cache) and/or an amount of data of the table to be scanned by the table scan that is stored by the stateful data processing service is less than a threshold amount. As another example, the stateful data processing service 102 may determine that an amount of data that will be returned by the table scan (or predicted/estimated to be returned) is less than a threshold amount. As another example, the stateful data processing service 102 may determine that compute resource usage to perform the at least one table scan is above a threshold amount.

In some embodiments, the execution history of any number of table scans that were previously performed by the stateful data processing service 102 and/or the stateless data processing service 110 may be used by the service 102 to determine whether to select a given table scan. For example, the stateful data processing service 102 may determine, based on an execution history of previous table scans that were performed on a particular table by the stateful data processing service 102 and the stateless data processing service 110, that an amount of time to perform a table scan on the table by the stateless data processing service 110 will be less than (e.g., is predicted/estimated to be less than) an amount of time to perform the table scan by the stateful data processing service 102. This may be the case, for example, if most or all of the previously performed table scans for the table were performed faster by the stateless data processing service 110 than by the stateful data processing service 102.

The stateful data processing service 102 may send an indication of each of the selected table scans to the stateless data processing service 110. The stateless data processing service 110 may receive the indication of each table scan and perform each table scan on respective tables of the database to generate one or more results. The stateless data processing service 110 may then send the one or more results to the stateful data processing service. In embodiments, the data from the respective tables is not maintained by the stateless data processing service 110 (e.g., there is no cache or other data store that retains/stores the results or any other data from the tables that were scanned). In embodiments, this is due to the multi-tenant and scalable nature of the stateless data processing service 110. Due to the multi-tenant nature of the stateless service, in embodiments, the same node, fleet of nodes, and/or other resources of the stateless service that were used for table scans for one client may subsequently be used by a different client for performing different table scans on a different database of the different client. In some embodiments, at least some of the table data and/or result data may be cached at the stateless data processing service for use by the same client.

The stateful data processing service 102 may receive the one or more results from the stateless data processing service 110. The stateful data processing service 102 may generate a query result based at least on the one or more results (e.g., the query result may include the one or more results). The stateful data processing service 102 may then send the query result to the client. In embodiments, the stateful data processing service 102 may also perform any number of other table scans of the query (e.g., the remaining table scans that were not selected for processing by the stateless data processing service 110. For each of the other table scans, the stateful data processing service 102 may copy, from the database to the data cache 106, at least a portion of the table to be used for the table scan. The stateful data processing service 102 may then perform each of the other table scans on the data cache 106 (e.g., on the copied table(s)) to generate one or more other results. The stateful data processing service 102 may then generate a query result based at least on the one or more results and the one or more other results and send the query result to the client.

In various embodiments, the data cache 106 may already store some or all of a table that needs to be scanned (e.g., the table was previously copied for a previous query). Therefore, the stateful data processing service 102 may perform the table scan on the data cache 106, without the need to first copy the table from the database data 104. Please note that the previous description of a stateful data processing service, stateless data processing service, database data, and performance of table scans/queries is a logical description and thus is not to be construed as limiting as to the implementation of a stateful data processing service, stateless data processing service, database data, and performance of table scans/queries, or portions thereof.

Figure 2:
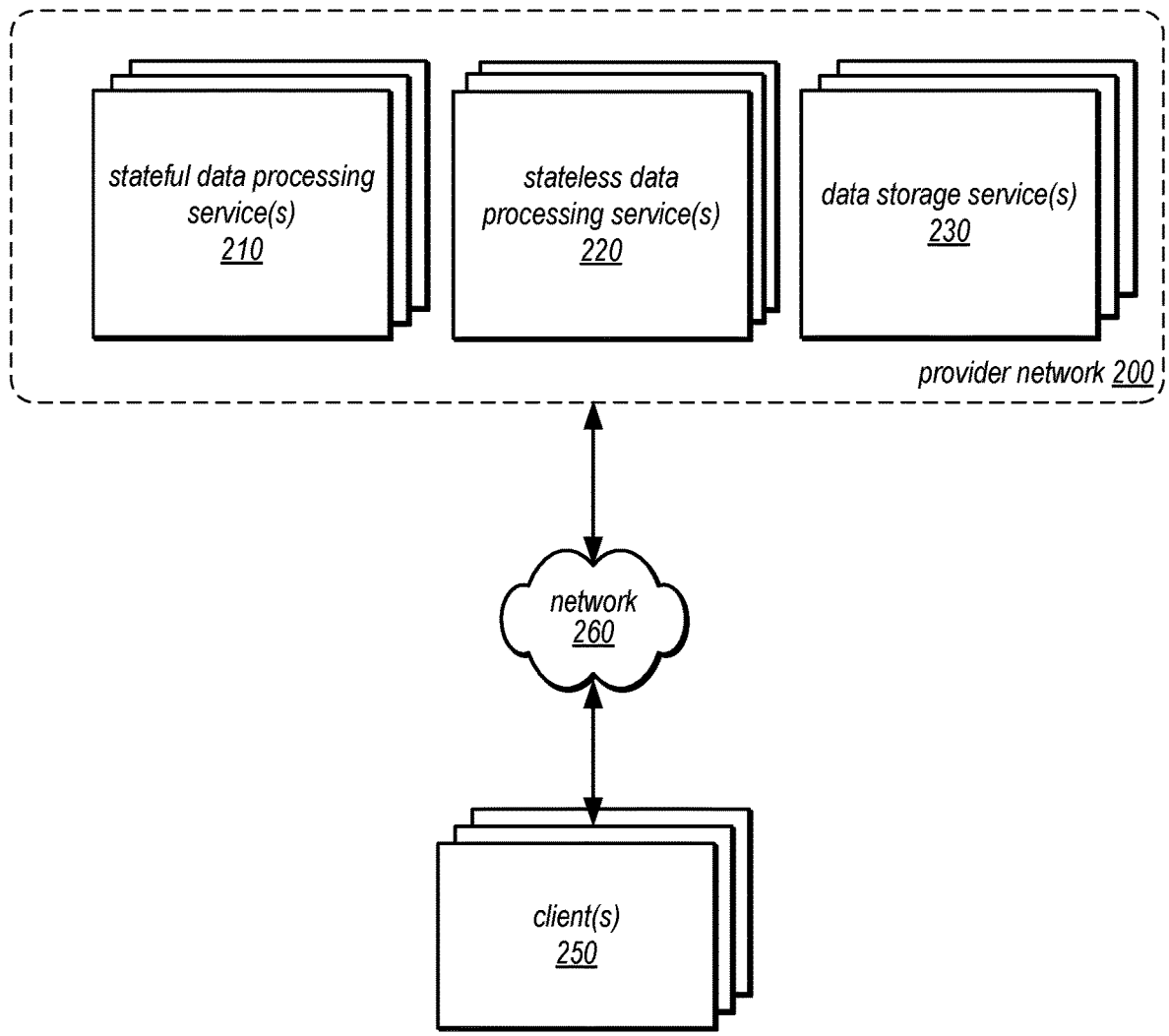
FIG. 2 is a logical block diagram illustrating a provider network offering data processing services that implement selecting between hydration-based scanning and stateless scale-out scanning to improve query performance, according to some embodiments.

FIG. 2 is a logical block diagram illustrating a provider network offering data processing services that implement selecting between hydration-based scanning and stateless scale-out scanning to improve query performance, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 900 described below with regard to FIG. 9), needed to implement and distribute the infrastructure and storage services offered by the provider network 200. In some embodiments, provider network 200 may implement various computing resources or services, such as a stateful data processing service(s) 210, (e.g., a map reduce service, a data warehouse service, and/or other large scale data processing services or database services), stateless data processing service(s) 220, and data storage service(s) 230 (e.g., object storage services or block-based storage services that may implement a centralized data store for various types of data), and/or any other type of network based services (which may include a virtual compute service and various other types of storage, processing, analysis, communication, event handling, visualization, and security services not illustrated). In embodiments, the provider network may offer any number of the above services to clients (e.g., any number of different types of stateful data processing services, stateless data processing services, and/or data storage services that may differ in functionality, performance, cost, etc.).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given system or service component (e.g., a component of stateful data processing service 210, stateless data processing service 220, or data storage service 230) may be implemented by a particular node or may be distributed across several nodes. In some embodiments, a given node may implement the functionality of more than one service system component (e.g., more than one data store component).

Stateful data processing services 210 may be various types of data processing services that perform general or specialized data processing functions (e.g., anomaly detection, machine learning, data mining, big data querying, or any other type of data processing operation). For example, in at least some embodiments, stateful data processing services 210 may include a map reduce service that creates clusters of processing nodes that implement map reduce functionality over data stored in the map reduce cluster as well as data stored in one of data storage services 230. In another example, stateful data processing service(s) 210 may include various types of database services (both relational and non-relational) for storing, querying, and updating data. Such services may be enterprise-class database systems that are highly scalable and extensible. Queries may be directed to a database in stateful data processing service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, stateful data processing service(s) 210 may implement, in some embodiments, a data warehouse service, such as discussed below with regard to FIG. 3 that utilizes another data processing service, such as stateless data processing service 220, to execute portions of queries or other access requests with respect to data that is stored in a remote data store, such as data storage service(s) 230 (or a data store external to provider network 200) to implement distributed data processing for distributed data sets.

Stateless data processing service 220, as discussed in more detail below with regard to FIGS. 3-6, may provide a service supporting many different data or file formats for data stored in a centralized data store, like one (or more) of data storage service(s) 230 including data stored in the file formats supported by data processing service(s) 210. Instead of reformatting (if the format of data in remote storage is not supported by the stateful data processing service(s) 210) and moving data from data storage service(s) 230 into the stateful data processing service(s) 210, stateless data processing service 220 may efficiently read data from data storage service(s) 230 according to the data format in which the data is already stored in data storage service(s) 230. Stateless data processing service 220 may perform requested operations, such as scan operations that filter or project data results, aggregation operations that aggregate data values and provide partial or complete aggregation results, sorting, grouping, or limiting operations that organize or reduce the determined data results from data in data storage service(s) 230 in order to minimize the amount of data transferred out of data storage service(s) 230.

For example, stateless data processing service 220 may execute different operations that are part of a larger query plan generated at a stateful data processing service 210 and provide results to the stateful data processing service 210 by relying upon requests from data processing service(s) 210 to determine the different operations to perform. In this way, stateless data processing service 220 may be implemented as a dynamically scalable and stateless data processing service that is fault tolerant without the need to support complex query planning and execution for multiple different data formats. Instead, stateless data processing service 230 may offer a set of data processing capabilities to access data stored in a wide variety of data formats (which may not be supported by different stateful data processing service(s) 210) that can be programmatically initiated on behalf of another data processing client, such as stateful data processing service 210.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds of object or file data stores for putting, updating, and getting data objects or files. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as audio files and web site log files. Data storage service(s) 230 may be accessed via programmatic interfaces (e.g., APIs) or graphical user interfaces. For example, stateless data processing service 220 may access data objects stored in data storage services via the programmatic interfaces (as discussed below with regard to FIGS. 5-6).

Generally speaking, clients 250 may encompass any type of client that can submit network-based requests to provider network 200 via network 260, including requests for storage services (e.g., a request to query a data processing service 210, or a request to create, read, write, obtain, or modify data in data storage service(s) 230, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of stateful data processing service(s) 210, stateless data processing service 220, or storage resources in data storage service(s) 230 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment. Similarly, a client 250 may be an analytics application that relies upon stateful data processing service(s) 210 to execute various queries for data already ingested or stored in the data processing service (e.g., such as data maintained in a data warehouse service, like data warehouse service 300 in FIG. 3 below) or data stored in a data lake hosted in data storage service(s) 230 by performing federated data processing between the data processing service 210 and stateless data processing service 220 (as discussed below with regard to FIG. 5).

Clients 250 may convey network-based services requests (e.g., access requests to read or write data may be directed to data in data storage service(s) 230, or operations, tasks, or jobs, such as queries, being performed as part of stateful data processing service(s) 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. In some embodiments, clients of stateful data processing services 210, stateless data processing service 220, and/or data storage service(s) 230 may be implemented within provider network 200 (e.g., an application hosted on a virtual computing resource that utilizes a stateful data processing service 210 to perform database queries) to implement various application features or functions and thus various features of client(s) 250 discussed above may be applicable to such internal clients as well.

Figure 3:
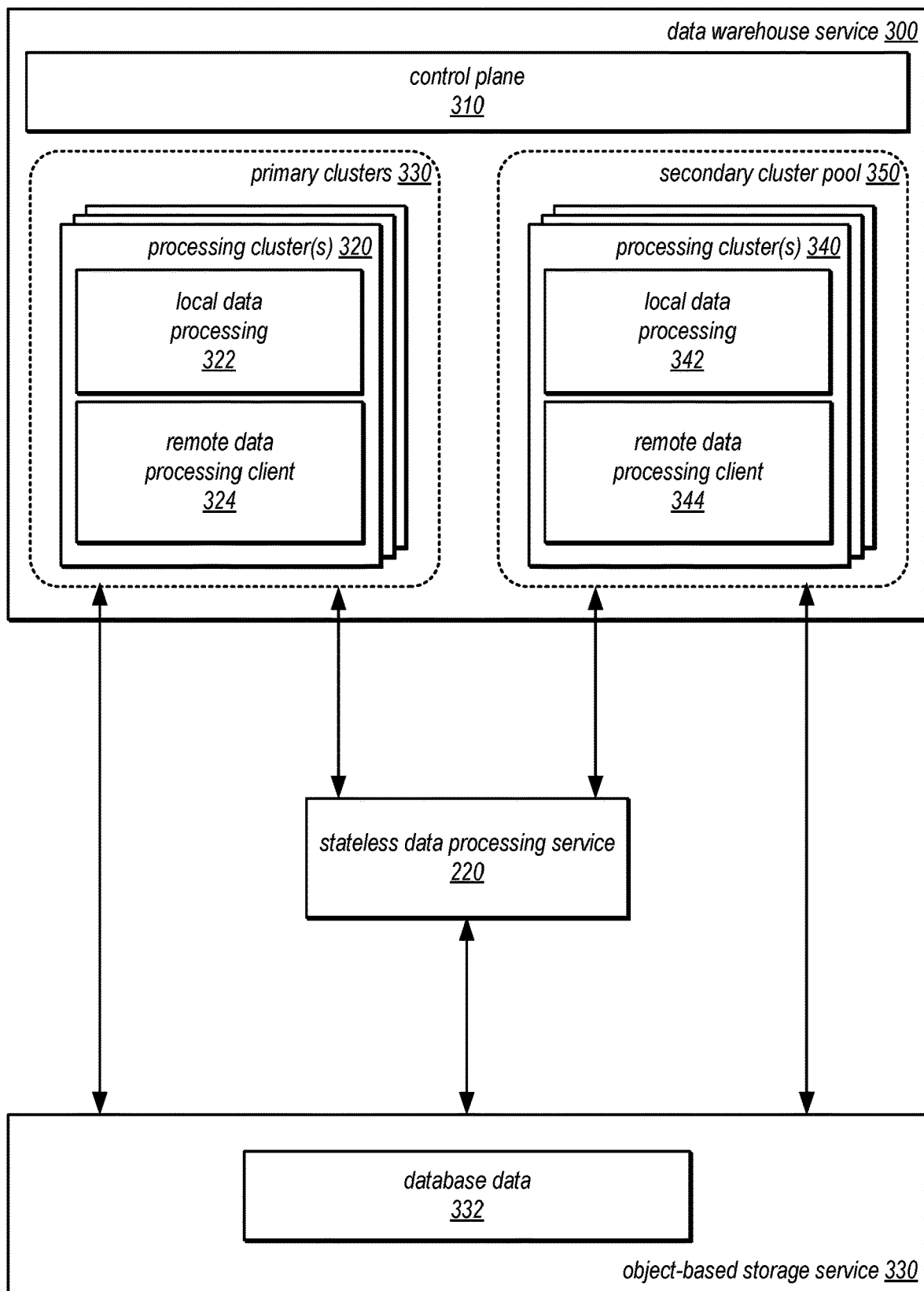
FIG. 3 is a logical block diagram of a data warehouse service implementing primary and secondary processing clusters that utilize a stateless data processing service to perform sub-queries to remote data via query engines hosted in a stateless data processing service, according to some embodiments.

In at least some embodiments, one of stateful data processing service(s) 210 may be a data warehouse service. FIG. 3 is a logical block diagram of a data warehouse service implementing primary and secondary processing clusters that utilize a stateless data processing service to perform sub-queries (e.g., selected table scan(s) and associated operations) to remote data via query engines hosted in a stateless data processing service, according to some embodiments. A data warehouse service, such as data warehouse service 300, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as may be equally adapted to implement embodiments for various other types of relational database systems, such as row-oriented database systems. Therefore, the following examples are not intended to be limiting as to various other types or formats of database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Data warehouse service 300 may be implemented by a large collection of computing devices, such as customized or off-the-shelf computing systems, servers, or any other combination of computing systems or devices, such as the various types of systems 900 described below with regard to FIG. 9. Different subsets of these computing devices may be controlled by control plane 310. Control plane 310, for example, may provide a cluster control interface to clients or users who wish to interact with the processing clusters 320 managed by control plane 310. For example, control plane 310 may generate one or more graphical user interfaces (GUIs) for storage clients, which may then be utilized to select various control functions offered by the control interface for the processing clusters 320 hosted in the data warehouse service 300. Control plane 310 may provide or implement access to various metrics collected for the performance of different features of data warehouse service 300, including processing cluster performance and the metrics collected with respect to result cache performance for sub-queries by cache management, in some embodiments.

As discussed above, various clients (or customers, organizations, entities, or users) may wish to store and manage data using a data management service. Processing clusters may respond to various requests, including write/update/store requests (e.g., to write data into storage) or queries for data (e.g., such as a Server Query Language request (SQL) for particular data), as discussed below with regard to FIG. 5, along with many other data management or storage services. Multiple users or clients may access a processing cluster to obtain data warehouse services. In at least some embodiments, a data warehouse service 300 may provide network endpoints to the clusters which allow the clients to send requests and other messages directly to a particular cluster. Network endpoints, for example may be a particular network address, such as a URL, which points to a particular cluster. For instance, a client may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Processing clusters, such as processing clusters 320 and 340, hosted by the data warehouse service 300 may provide an enterprise-class database query and management system that allows users to send data processing requests to be executed by the clusters 320, such as by sending a query to a cluster control interface implemented by the network-based service. Processing clusters 320 may perform data processing operations with respect to data stored locally in a processing cluster, as well as remotely stored data. For example, object-based storage service 330 may be a data storage service 230 implemented by provider network 200 that stores remote data, such as backups or other data of a database stored in a cluster. In some embodiments, database data may not be stored locally in a processing cluster 320 but instead may be stored in object-based storage service 330 (e.g., with data being partially or temporarily stored in processing cluster 320 to perform queries). Queries sent to a processing cluster 320 (or routed/redirect/assigned/allocated to processing cluster(s) 340 from processing cluster(s) 320) may be directed to local data stored in the processing cluster and/or remote data. Therefore, processing clusters may implement local data processing, such as local data processing 322 and 342, (discussed below with regard to FIGS. 5 and 6) to plan and execute the performance of queries with respect to local data in the processing cluster, as well as a remote data processing client, such as remote data processing clients 324 and 344, to direct execution of different sub-queries (e.g., operations determined as part of the query plan generated at the processing cluster 320) that are assigned to stateless data processing service 220 with respect to processing remote database data 332).

In some embodiments, data warehouse service 300 may implement primary clusters 330 and secondary cluster pool 350. Primary clusters 330 may be reserved, allocated, permanent, or otherwise dedicated processing resources that store and/or provide access to a database for a client of data warehouse service 300, in some embodiments. Secondary cluster pool 350 may be a set of warmed, pre-configured, initialized, or otherwise prepared clusters which may be on standby to provide additional query performance capacity for a primary cluster 330. Control plane 310 may manage secondary cluster pool 350 by managing the size of secondary cluster pool 350 (e.g., by adding or removing processing clusters 340 based on demand). Control plane 310 may determine the capabilities or configuration (which may be different) of processing cluster(s) 340 in secondary cluster pool 350 (e.g., maintaining a number of 10 node clusters, 15 node clusters, 20 node clusters, etc.). Processing clusters 340 in secondary cluster pool 350 may be obtained or provisioned for a primary cluster 330, as discussed in detail below with regard to FIG. 8.

As databases are created, updated, and/or otherwise modified, snapshots, copies, or other replicas of the database at different states may be stored separate from data warehouse service 300 in object-based storage service 330, in some embodiments. For example, a leader node, or other processing cluster component, may implement a backup agent or system that creates and store database backups for a database to be stored as database data 332 in object-based storage service 330. Database data 332 may include user data (e.g., tables, rows, column values, etc.) and database metadata (e.g., information describing the tables which may be used to perform queries to a database, such as schema information, data distribution, range values or other content descriptors for filtering out portions of a table from a query, etc.). A timestamp or other sequence value indicating the version of database data 332 may be maintained in some embodiments, so that the latest database data 332 may, for instance, be obtained by a processing cluster in order to perform queries sent for secondary query performance.

Figure 4:
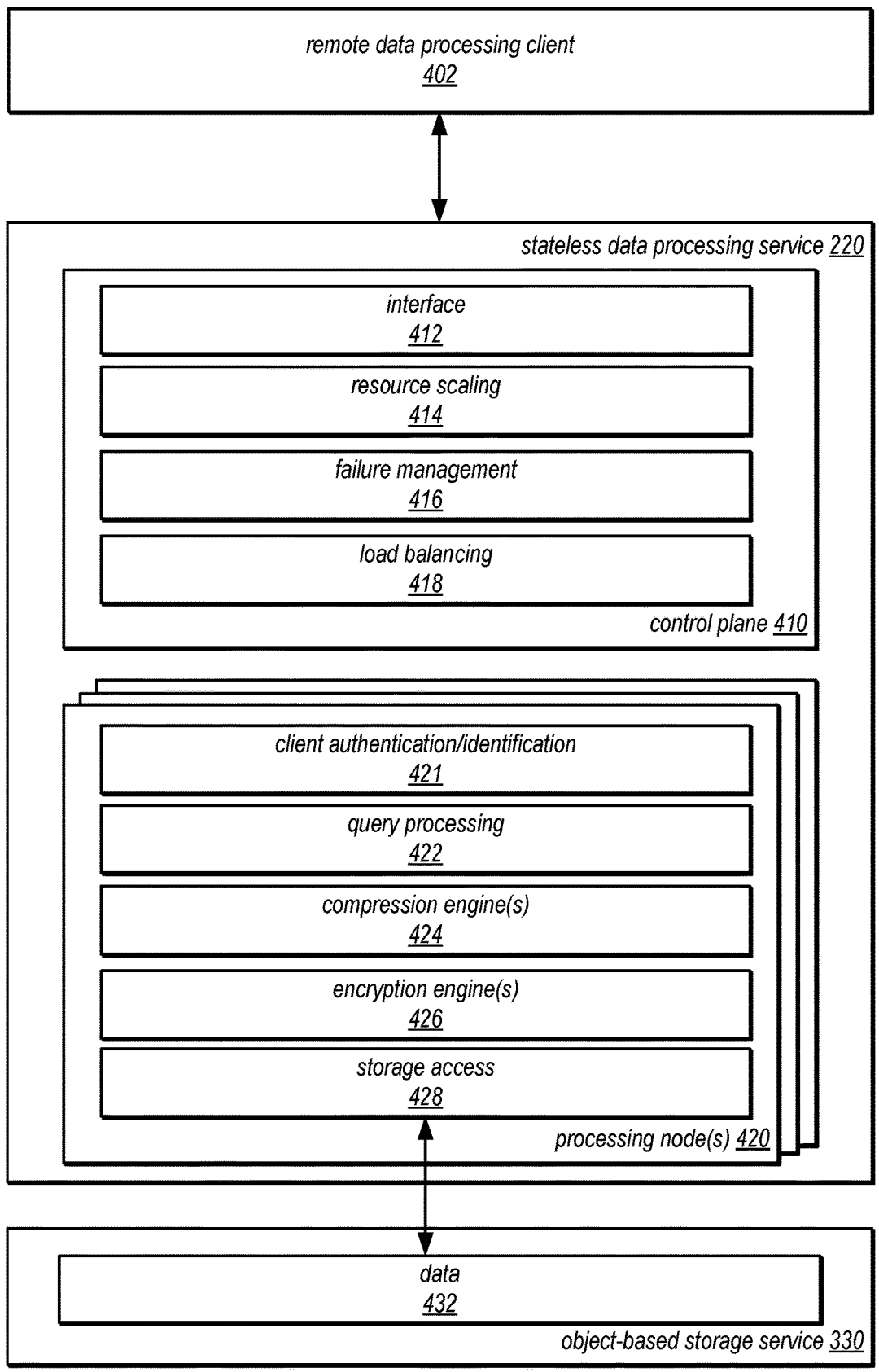
FIG. 4 is a logical block diagram illustrating a stateless data processing service, according to some embodiments.

FIG. 4 is a logical block diagram illustrating a stateless data processing service, according to some embodiments. As noted above in FIG. 2, stateless data processing service 220 may receive requests to perform processing operations with respect to data stored 432 stored in a data storage service (e.g., backup data or other database data, such as other database tables or data that is not stored according to a format, schema, or structure like that of data stored in data warehouse service 300). Processing requests may be received from a client, such as remote data processing client(s) 402 (which may another data processing service 210, like data warehouse service 300 or another data processing client, such as a database engine/cluster or map reduce cluster implemented outside of provider network 200 and communicating with stateless data processing service 220 in order to process queries with respect to data stored within provider network 200 in a data storage service 230 or to process data stored outside of provider network 200 (when the data is made accessible to stateless data processing service 220).

Stateless data processing service 220 may implement a control plane 410 and multiple processing node(s) 420 to execute processing requests received from remote data processing client(s) 402. Control plane 410 may arbitrate, balance, select, or dispatch requests to different processing node(s) 420 in various embodiments. For example, control plane 410 may implement interface 412 which may be a programmatic interface, such as an application programming interface (API), that allows for requests to be formatted according to the interface 412 to programmatically invoke operations. In some embodiments, the API may be defined to allow operation requests defined as objects of code generated at and sent from remote data processing client(s) 402 (based on a query plan generated at remote data processing client(s) 402) to be compiled or executed in order to perform the assigned operations at stateless data processing service 220.

In some embodiments, stateless data processing service 220 may implement load balancing 418 to distribute remote processing requests across different processing node(s) 420. For example, a remote processing request received via interface 412 may be directed to a network endpoint for a load-balancing component of load balancing 418 (e.g., a load balancing server or node) which may then dispatch the request to one of processing node(s) 420 according to a load balancing scheme. A round-robin load balancing, for instance, may be used to ensure that remote data processing requests are fairly distributed amongst processing node(s) 420. However, various other load-balancing schemes may be implemented. As stateless data processing service 220 may receive many remote data processing requests from multiple remote data processing client(s) 402, load balancing 418 may ensure that incoming requests are not directed to busy or overloaded processing node(s) 420.

Stateless data processing service 220 may also implement resource scaling 414. Resource scaling 414 may detect when the current request rate or workload upon a current number of processing node(s) 420 exceeds or falls below over-utilization or under-utilization thresholds for processing nodes. In response to detecting that the request rate or workload exceeds an over-utilized threshold, for example, then resources scaling 414 may provision, spin up, activate, repurpose, reallocate, or otherwise obtain additional processing node(s) 420 to processing received remote data processing requests. Similarly, the number of processing node(s) 420 could be reduced by resource scaling 414 in the event that the request rate or workload of processing node(s) falls below the under-utilization threshold.

Stateless data processing service 220 may also implement failure management 416 to monitor processing node(s) 420 and other components of stateless data processing service 220 for failure or other health or performance states that may need to be repaired or replaced. For example, failure management 416 may detect when a processing node fails or becomes unavailable (e.g., due to a network partition) by polling processing node(s) 420 to obtain health or performance status information. Failure management may initiate shutdown or halting of processing at failing processing node(s) 420 and provision replacement processing node(s) 420.

Figure 9:
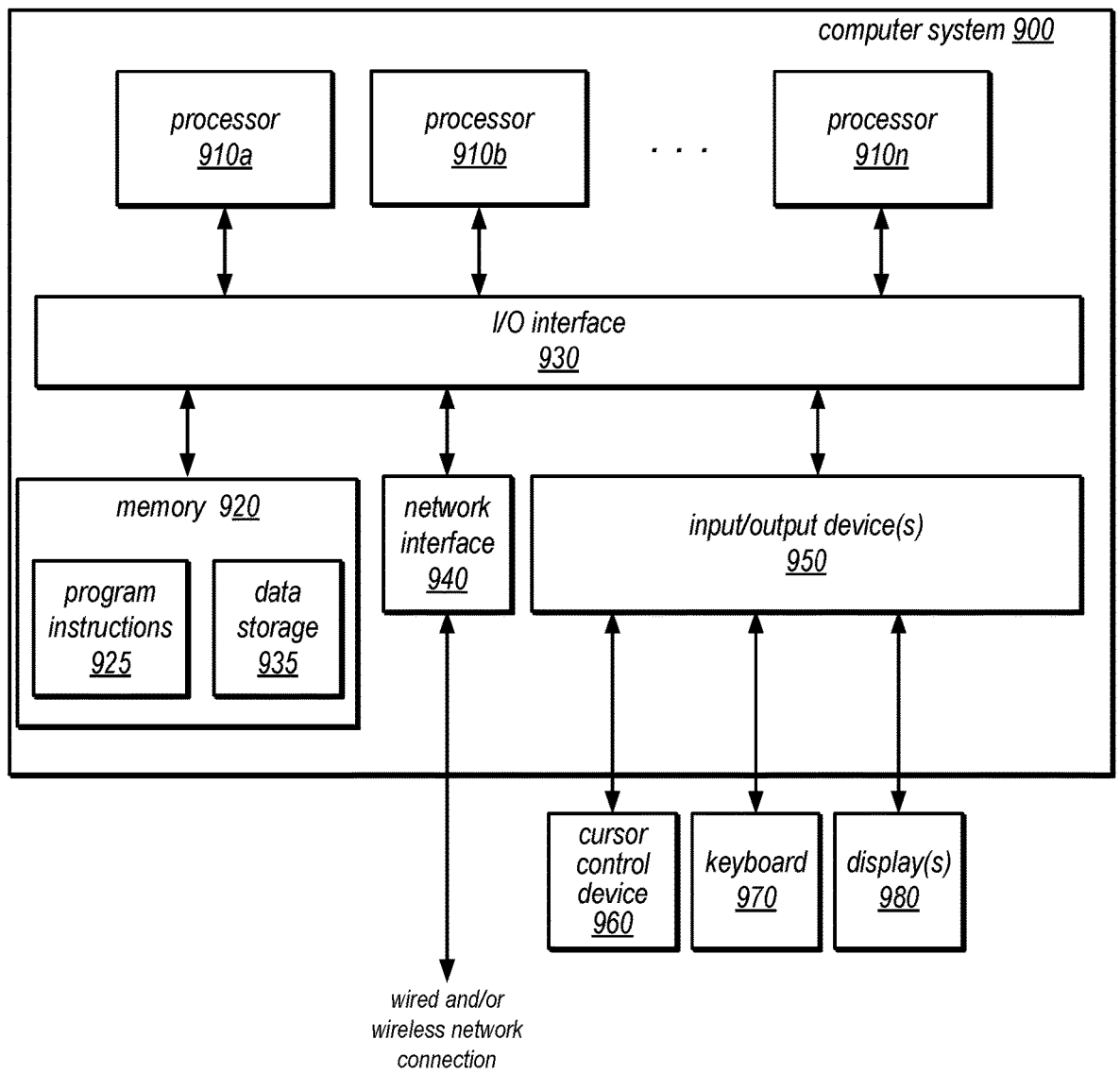
FIG. 9 illustrates an example system that implements the various methods, techniques, and systems described herein, according to some embodiments.

Processing node(s) 420 may be implemented as separate computing nodes, servers, or devices, such as computing systems 900 in FIG. 9, to perform data processing operations on behalf of remote data processing client(s) 402. Processing node(s) 420 may implement stateless, in-memory processing to execute processing operations, in some embodiments. In this way, processing node(s) 420 may have fast data processing rates. Processing node(s) 420 may implement client authentication/identification 421 to determine whether a remote data processing client 402 has the right to access data 432 in storage service 430. For example, client authentication/identification 421 may evaluate access credentials, such as a username and password, token, or other identity indicator by attempting to connect with storage service 430 using the provided access credentials. If the connection attempt is unsuccessful, then the data processing node 402 may send an error indication to remote data processing client 402.

Processing node(s) 420 may implement query processing 422 or other features of a query engine which may perform multiple different sub-queries (e.g., processing operations) and support multiple different data formats. For example, query processing 422 may implement separate tuple scanners for each data format which may be used to perform scan operations that scan data 432 and which may filter or project from the scanned data, search (e.g., using a regular expression) or sort (e.g., using a defined sort order) the scanned data, aggregate values in the scanned data (e.g., count, minimum value, maximum value, and summation), and/or group by or limit results in the scanned data. Remote data processing requests may include an indication of the data format for data 432 so that query processing 422 may use the corresponding tuple scanner for data 432. Query processing 422 may, in some embodiments, transform results of operations into a different data format or schema according to a specified output data format in the remote data processing request.

In some embodiments, data 432 may be stored in encrypted or compressed format. Processing node(s) 420 may implement compression engine(s) 424 to decompress data 432 according to a compression technique identified for data 432, such as lossless compression techniques like run-length encoding, Lempel-Ziv based encoding, or bzip based encoding. Processing node(s) 420 may implement encryption engine(s) 426 to decrypt data 432 according to an encryption technique and/or encryption credential, such as a key, identified for data 432, such as symmetric key or public-private key encryption techniques.

Processing node(s) 420 may implement storage access 428 to format, generate, send and receive requests to access data 432 in storage service 430. For example, storage access 428 may generate requests to obtain data according to a programmatic interface for storage service 430. In some embodiments, other storage access protocols, such as internet small computer interface (iSCSI), may be implemented to access data 432.

Figure 5:
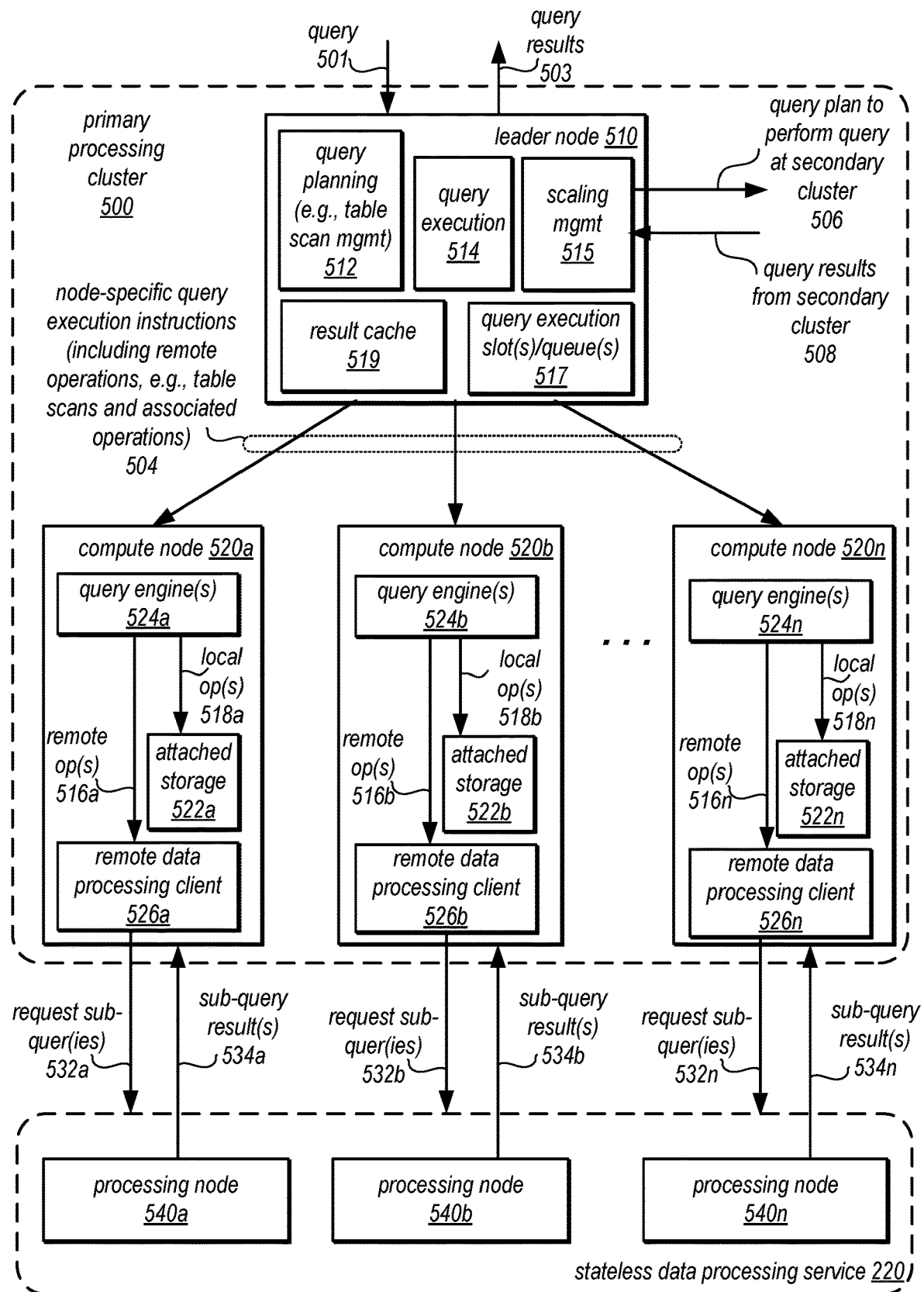
FIG. 5 is a logical block diagram illustrating an example of table scan management at a primary cluster of a data warehouse service, according to some embodiments.

FIG. 5 is a logical block diagram illustrating an example primary processing cluster of a data warehouse service using a stateless data processing service that implements secondary manager, according to some embodiments. Primary processing cluster 500 may be data warehouse service cluster, like processing clusters 320 discussed above with regard to FIG. 3, or another processing cluster that distributes execution of a query among multiple processing nodes. As illustrated in this example, a primary processing cluster 500 may include a leader node 510 and compute nodes 520a, 520b, and 520n, which may communicate with each other over an interconnect (not illustrated). Leader node 510 may implement query planning 512 to generate query plan(s), query execution 514 for executing queries on primary processing cluster 500 that perform data processing that can utilize remote query processing resources for remotely stored data (e.g., by utilizing one or more query execution slot(s)/queue(s) 517) and scaling manager 515 for selecting, routing, directing, or otherwise causing a received query to be performed using secondary capacity resources (e.g., resources that can scale up to handle increased query/data processing load), such as a secondary processing cluster. As described herein, each node in a primary processing cluster 500 may include attached storage, such as attached storage 522a, 522b, and 522n, on which a database (or portions thereof) may be stored on behalf of clients (e.g., users, client applications, and/or storage service subscribers). In embodiments, the query planning 512 may implement functionality described for the table scans manager 108 of FIG. 1 (e.g., selecting certain table scans and associated operations that are to be sent to the stateless data processing service and determining other table scans and associated operations that are to be performed locally, using attached storage 522). In embodiments, the attached storage 522 may implement the data cache 106 of FIG. 1.

Note that in at least some embodiments, query processing capability may be separated from compute nodes, and thus in some embodiments, additional components may be implemented for processing queries. Additionally, it may be that in some embodiments, no one node in processing cluster 500 is a leader node as illustrated in FIG. 5, but rather different nodes of the nodes in processing cluster 500 may act as a leader node or otherwise direct processing of queries to data stored in processing cluster 500. While nodes of processing cluster may be implemented on separate systems or devices, in at least some embodiments, some or all of processing cluster may be implemented as separate virtual nodes or instance on the same underlying hardware system (e.g., on a same server).

In at least some embodiments, primary processing cluster 500 may be implemented as part of a data warehouse service, as discussed above with regard to FIG. 3, or another one of data processing service(s) 210. Leader node 510 may manage communications with clients, such as clients 250 discussed above with regard to FIG. 2. For example, leader node 510 may be a server that receives a query 501 from various client programs (e.g., applications) and/or subscribers (users), then parses them and develops an execution plan (e.g., query plan(s)) to carry out the associated database operation(s)). More specifically, leader node 510 may develop the series of steps necessary to obtain results for the query. Query 501 may be directed to data that is stored both locally within processing cluster 500 (e.g., at one or more of compute nodes 520) and data stored remotely (which may be accessible by stateless data processing service 220). Leader node 510 may also manage the communications among compute nodes 520 instructed to carry out database operations for data stored in the processing cluster 500. For example, node-specific query instructions 504 may be generated or compiled code by query execution 514 that is distributed by leader node 510 to various ones of the compute nodes 520 to carry out the steps needed to perform query 501, including executing the code to generate intermediate results of query 501 at individual compute nodes may be sent back to the leader node 510. Leader node 510 may receive data and query responses or results from compute nodes 520 in order to determine a final result 503 for query 501. A database schema, data format and/or other metadata information for the data stored among the compute nodes, such as the data tables stored in the cluster, may be managed and stored by leader node 510. Query planning 512 may account for remotely stored data by generating node-specific query instructions that include remote operations to be directed by individual compute node(s). As discussed in more detail below with regard to FIG. 7, a leader node may implement scaling manager 515 to send 506 a query plan generated by query planning 512 to be performed at a secondary processing cluster and return results 508 received from the secondary processing cluster to a client as part of results 503. In this way, secondary query processing may occur without client application changes to establish a separate connection or communication scheme with secondary processing resources, allowing for seamless scaling between primary and secondary processing capacity.

In at least some embodiments, a result cache 519 may be implemented as part of leader node 510. For example, as query results are generated, the results may also be stored in result cache 519 (or pointers to storage locations that store the results either in primary processing cluster 500 or in external storage locations), in some embodiments. Result cache 519 may be used instead of secondary capacity, in some embodiments, by recognizing queries which would otherwise be sent to a secondary processing cluster to be performed that have results stored in result cache 519. Various caching strategies (e.g., LRU, FIFO, etc.) for result cache 519 may be implemented, in some embodiments. Although not illustrated in FIG. 4, result cache 519 could be stored in other storage systems (e.g., other storage services, such as a NoSQL database) and/or could store sub-query results for requests to stateless data processing service 220 instead of or in addition to full query results).

Processing cluster 500 may also include compute nodes, such as compute nodes 520a, 520b, and 520n. Compute nodes 520, may for example, be implemented on servers or other computing devices, such as those described below with regard to computer system 900 in FIG. 9, and each may include individual query processing "slices" defined, for example, for each core of a server's multi-core processor, one or more query processing engine(s), such as query engine(s) 524*a*, 524*b*, and 524*n*, to execute the instructions 504 or otherwise perform the portions of the query plan assigned to the compute node. Query engine(s) 524 may access a certain memory and disk space in order to process a portion of the workload for a query (or other database operation) that is sent to one or more of the compute nodes 520. Query engine 524 may access attached storage, such as 522*a*, 522*b*, and 522*n*, to perform local operation(s), such as local operations 518*a*, 518*b*, and 518*n* (e.g., table scans and associated operations that were not selected for processing by the stateless data processing service 220). For example, query engine 524 may scan data in attached storage 522, access indexes, perform joins, semi joins, aggregations, or any other processing operation(s) assigned to the compute node 520.

Query engine 524*a* may also direct the execution of remote data processing operations, by providing remote operation(s), such as remote operations 516*a*, 516*b*, and 516*n*, to remote data processing clients, such as remote data processing client 526*a*, 526*b*, and 526*n*. Remote data processing clients 526 may be implemented by a client library, plugin, driver or other component that sends request sub-queries, such as sub-quer(ies) 532*a*, 532*b*, and 532*n* to stateless data processing service 220. As noted above, in some embodiments, stateless data processing service 220 may implement a common network endpoint to which request sub-quer(ies) 532 are directed, and then may dispatch the requests to respective processing nodes, such as processing nodes 540*a*, 540*b*, and 540*n*. Remote data processing clients 526 may read, process, or otherwise obtain results from processing nodes, including partial results of different operations (e.g., aggregation operations) and may provide sub-query result(s), including result(s) 534*a*, 534*b*, and 534*c*, back to query engine(s) 524, which may further process, combine, and or include them with results of location operations 518 (e.g., results of table scans and associated operations that were performed locally, on the attached storage/data cache). In some embodiments, the remote operations (e.g., selected table scan(s) and associated operations) may be sent from the query engine (e.g., query engine 524*a*) to a processing node of the stateless data processing service 220 (e.g., node 540*a*), and may receive results from the processing node, without the use of an intermediate client (e.g., remote data processing client 526*a*).

Compute nodes 520 may send intermediate results from queries back to leader node 510 for final result generation (e.g., combining, aggregating, modifying, joining, etc.). Remote data processing clients 526 may retry sub-query request(s) 532 that do not return within a retry threshold. As stateless data processing service 220 may be stateless, processing operation failures at processing node(s) 540 may not be recovered or taken over by other processing nodes 540, remote data processing clients 526 may track the success or failure of requested operation(s) 532, and perform retries when needed.

Attached storage 522 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column-oriented data formats or other data formats).

Figure 6:
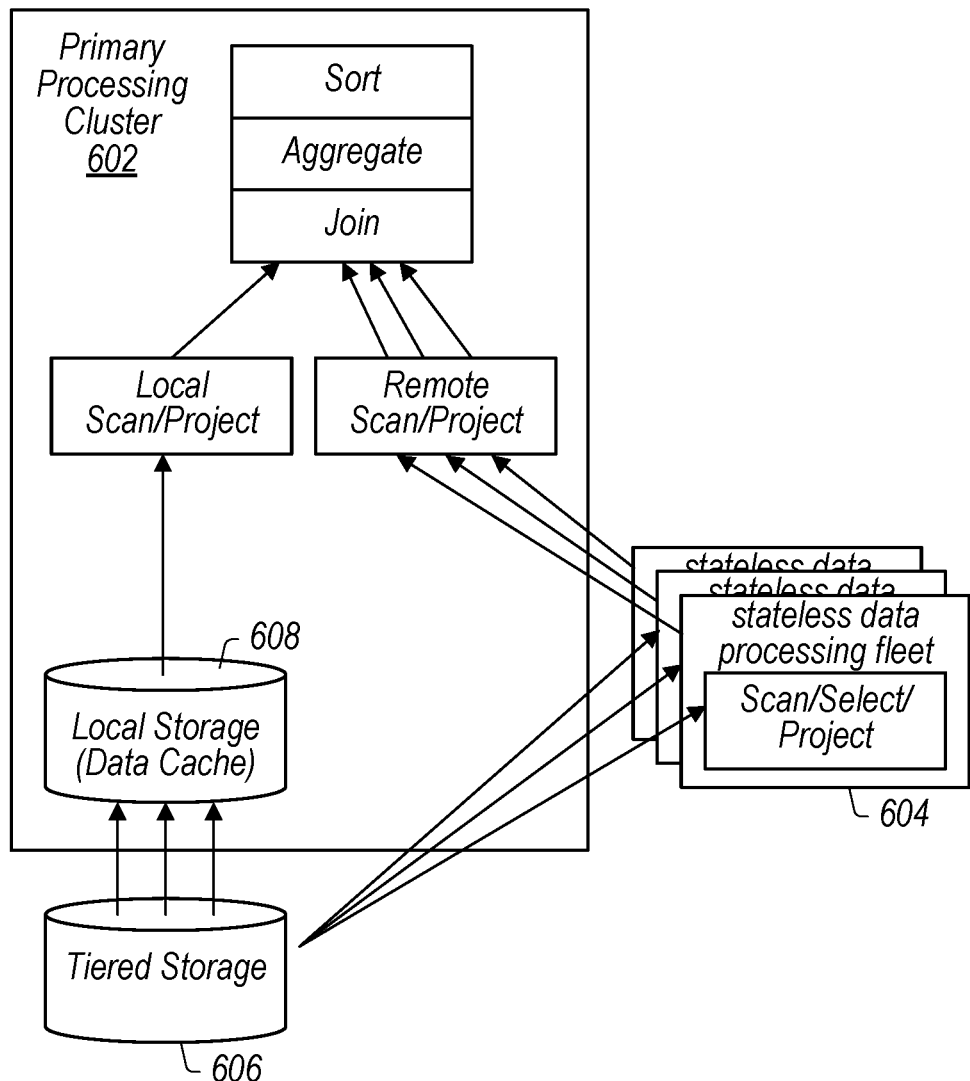
FIG. 6 is a logical block diagram illustrating an example of selecting between hydration-based scanning and stateless scale-out scanning to improve query performance, according to some embodiments.

FIG. 6 is a logical block diagram illustrating an example of selecting between hydration-based scanning and stateless scale-out scanning to improve query performance, according to some embodiments.

In the depicted embodiment, a primary processing cluster 602 of a stateful data processing service may select between hydration-based scanning and stateless scale-out scanning for each table scan of a query, as described herein. As shown, if the primary processing cluster 602 selects a table scan(s) to be processed by a stateless data processing service, then the primary processing cluster 602 may send an indication of the table scan to a stateless data processing fleet 604 (e.g., a group of any number of nodes) of the stateless data processing service, which performs the table scan on tiered storage (e.g., scan/select/project) and then sends the remote results back to the primary processing cluster 602. In the depicted embodiment, the results are sent back to a remote scan/project node(s) of the primary processing cluster. The remote scan/project node(s) may receive any number of remote results from any number of different fleets of the stateless data processing service (e.g., concurrently and/or in parallel), where each remote result is for a remote table scan of the query that is performed by the stateless data processing service.

The primary processing cluster 602 may copy table data from the tiered storage 606 into local storage (e.g., data cache 106) and perform other table scan(s) (e.g., the table scans that were not selected to be processed by the stateless data processing service) on the copied table data (e.g., scan/project operations) to generate other results. Similar to the remote scan/project node(s) discussed above, the local scan/project node(s) of the primary processing cluster may receive any number of local results (e.g., concurrently and/or in parallel), where each local result is for a local table scan of the query that is performed by the stateful data processing service (e.g., by the primary processing cluster 602). The primary processing cluster 602 may receive the local results from the local scan/project node(s) and the remote results from the remote scan/project node(s) and perform other data processing operations on the local results and the other remote results (e.g., join/aggregate/sort) to generate a final query result. The primary processing cluster 602 may then return the query result to the client.

Although FIGS. 2-6 have been described and illustrated in the context of a provider network implementing different data processing services, like a data warehousing service, the various components illustrated and described in FIGS. 2-6 may be easily applied to other data processing systems that can utilize a stateless data processing service to perform tables scans and/or other operations. As such, FIGS. 2-6 are not intended to be limiting as to other embodiments of caching results for sub-queries to different data store locations.

Figure 7:
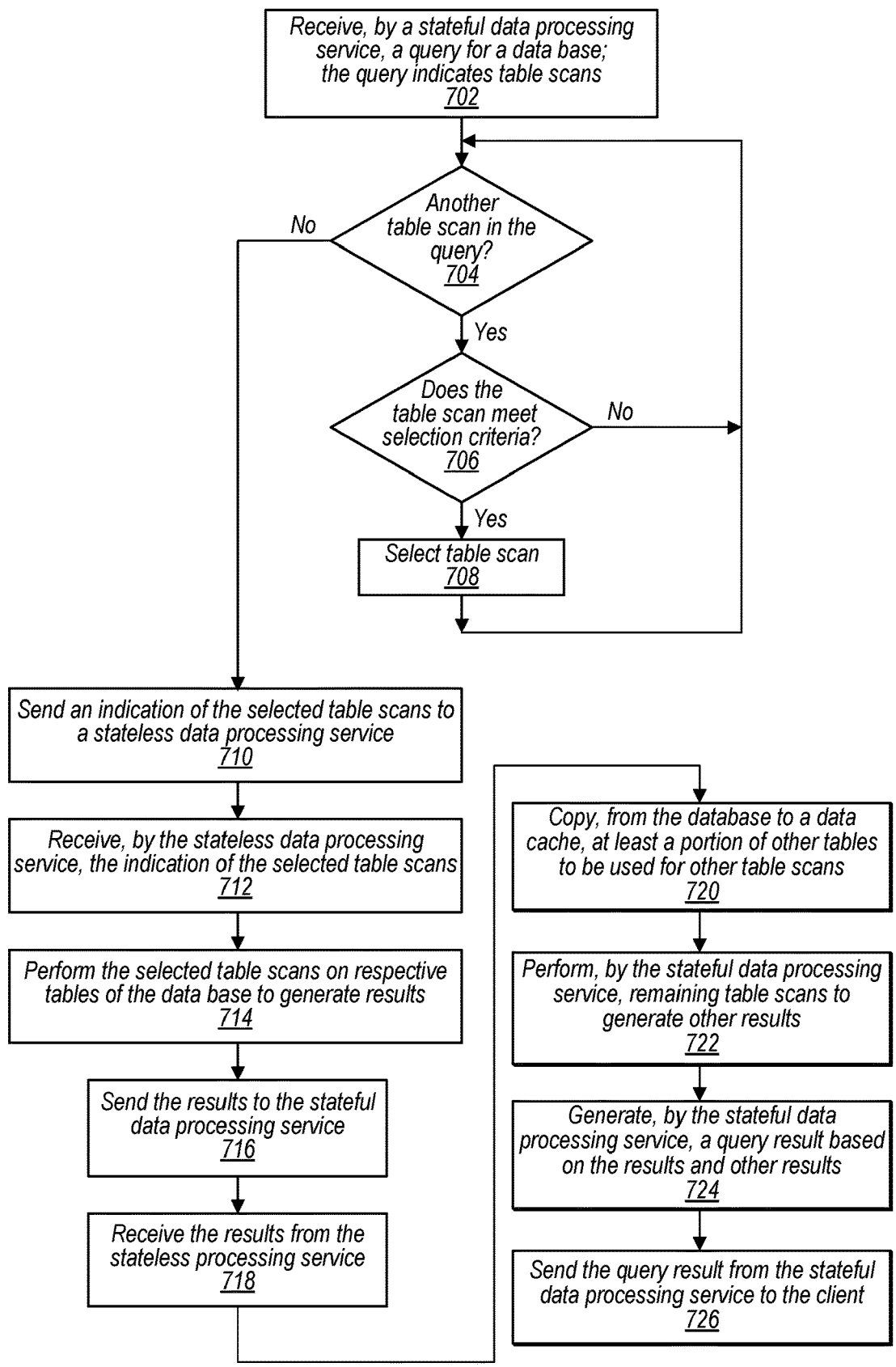
FIG. 7 is a high-level flowchart illustrating methods and techniques to implement selecting between hydration-based scanning and stateless scale-out scanning to improve query performance, according to some embodiments.

FIG. 7 is a high-level flowchart illustrating methods and techniques to implement selecting between hydration-based scanning and stateless scale-out scanning to improve query performance, according to some embodiments. Various different systems and devices may implement the various methods and techniques described below, either singly or working together. Different combinations of services implemented in different provider networks operated by different entities may implement some or all of the methods (e.g., a data warehouse cluster in a service of a first provider network, an intermediate data processing service in a second provider network, and a data set stored in a service of a third provider network). Different types of query engines or non-distributed query performance platforms may implement these techniques. Alternatively, various other combinations of different systems and devices located within or without provider networks may implement the below techniques. Therefore, the above examples and or any other systems or devices referenced as performing the illustrated method, are not intended to be limiting as to other different components, modules, systems, or devices.

As indicated at block 702, a stateful data processing service receives a query for a database. The query may indicate any number of table scans. At block 704, the service determines whether there is another table scan of the query to process. If so, then at block 706, the service determines whether the table scan meets one or more selection criteria. If not, the process returns to block 704. If so, then at block 708, the service selects the table scan. The process returns to block 704.

At block 704, if there are no more table scans in the query, then at block 710, the service sends an indication of the selected table scans to the stateless data processing service. At block 712, the stateless data processing service receives the indication of selected table scans. At block 714, the stateless data processing service performs the selected scans on the respective tables to generate results. At block 716, the stateless data processing service sends the results back to the stateful data processing service. In some embodiments, the results of the table scan (e.g., formatted query results) and/or table data are not cached by the stateless data processing service, due to the stateless nature of the stateless data processing service. In some embodiments, the results of the table scan (e.g., formatted query results) and/or table data may be cached for at least a period of time, so that the results and/or table data may be available for a subsequent query/table scan made by the client.

At block 718, the stateful data processing service receives the results from the stateless data processing service. At block 720, the stateful data processing service copies, from the database to the local data cache, at least a portion (or all) of the other tables to be used for other table scans (unless table data is already present in the data cache). At block 722, the stateful data processing service performs remaining table scans to generate other results. At block 724, the stateful data processing service generates a query result based on the results and other results. At block 726, the stateful data processing service sends the query result to the client.

Figure 8:
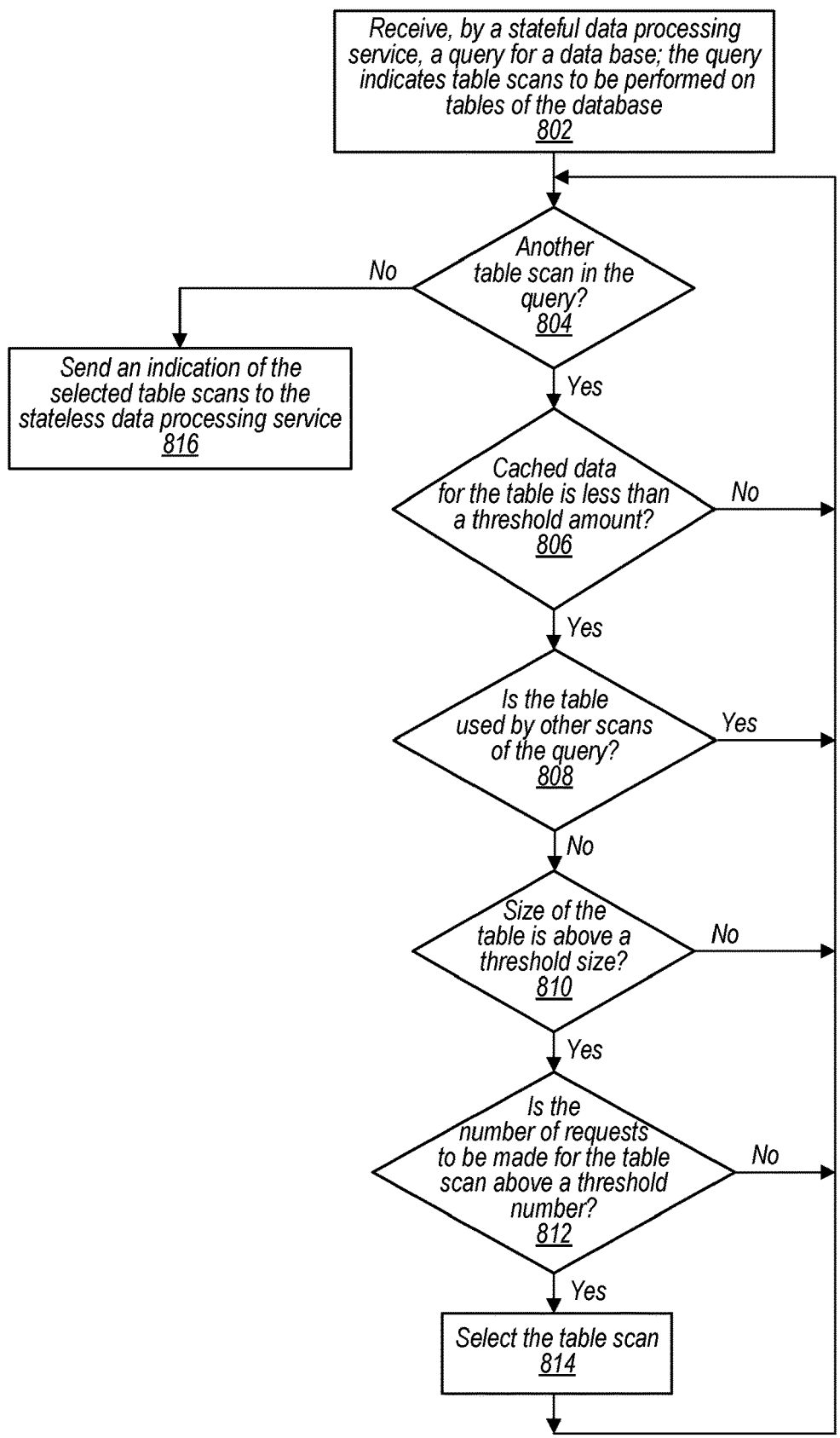
FIG. 8 is a high-level flowchart illustrating methods and techniques to implement selecting between hydration-based scanning and stateless scale-out scanning to improve query performance, according to some embodiments.

FIG. 8 is a high-level flowchart illustrating methods and techniques to implement selecting between hydration-based scanning and stateless scale-out scanning to improve query performance, according to some embodiments.

As indicated at 802, the stateful data processing service receives a query for a database. The query indicates table scans to be performed on the database. At block 804, the service determines if there is another table scan of the query to process. If so, then at block 806, the service determines if cached data for the table scan is less than a threshold amount (e.g., if the amount of data of the target table for the data scan is less than 100 MB). If not, the process returns to 804, because the stateful data processing service can perform that table scan locally to take advantage of the locally cached data for that table. If the cached data is less than the threshold amount of data, then at block 808, the service determines if the table is also used by other table scans of the same query (or if the table is also used by at least a threshold number of other table scans of the same query). If so, then the process returns to 804, because the stateful data processing service can take advantage of the local data cache to provide faster results for multiple table scans, once the table data is locally cached. If not, then at block 810, the service determines if the size of the table is above a threshold size (e.g., to take advantage of the ability of the stateless data processing service to execute table scans faster than the stateful service). If not, then the process returns to 804.

If the size of the table is above the threshold size, then at block 812, the service determines if the number of requests to be made for the table scan by the stateless service is above a threshold number in order to take advantage of the stateless data processing service to perform higher throughput queries (e.g., the number of parallel/concurrent requests to be made to execute the table scan on the database). If not, the process returns to 804. If so, then the service selects the table scan at block 814. At block 804, if there are no more table scans to process, then at block 816, the service sends an indication of the selected table scans to the stateless data processing service.

The depicted example is just one example embodiment of a certain number of criteria that are checked in a particular order. In various embodiments, any number of criteria may be used, and in any particular order. Moreover, any number of other criterium may be used when determining whether to select a table scan to be processed remotely by the stateless service. Another example of a criterium that may be used is computer resource usage/complexity. If the stateful data processing service determines that compute resource usage to perform a table scan is above a threshold amount, then it may select the table scan to be processed remotely by the stateless service; if not, then it may process the table scan locally.

In embodiments, the stateful data processing service may determine that the compute resource usage to perform a table scan is above a threshold amount if the determined complexity of the table scan is above a threshold amount (e.g., above a quantified complexity, such as a complexity of 5 on a complexity scale between 0 and 10). For example, a table scan that has a larger number of predicates and/or a larger usage of compute resources for predicates may determined by the stateful service to have a higher complexity than another table scan with fewer predicates and/or less usage of compute resources for predicates. As an example, a table scan that uses regular expressions may have a higher complexity than another table scan that has no regular expressions and that uses simpler computations, such a computing a count or an average.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of selecting between hydration-based scanning and stateless scale-out scanning to improve query performance as described herein may be executed on one or more computer systems, which may interact with various other devices. One such computer system is illustrated by FIG. 9. In different embodiments, computer system 900 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. Display(s) 980 may include standard computer monitor(s) and/or other display systems, technologies or devices. In at least some implementations, the input/output devices 950 may also include a touch- or multi-touch enabled device such as a pad or tablet via which a user enters input via a stylus-type device and/or one or more digits. In some embodiments, it is contemplated that embodiments may be implemented using a single instance of computer system 900, while in other embodiments multiple such systems, or multiple nodes making up computer system 900, may host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

In some embodiments, at least one processor 910 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 920 may store program instructions and/or data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 920 as program instructions 925 and data storage 935, respectively. In other embodiments, program instructions and/or data may be received, sent or stored upon different types of computer-accessible media or on similar media separate from system memory 920 or computer system 900. Generally speaking, a non-transitory, computer-readable storage medium may include storage media or memory media such as magnetic or optical media, e.g., disk or CD/DVD-ROM coupled to computer system 900 via I/O interface 930. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 940.

In one embodiment, I/O interface 930 may coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. In addition, in some embodiments some or all of the functionality of I/O interface 930, such as an interface to system memory 920, may be incorporated directly into processor 910.

Network interface 940 may allow data to be exchanged between computer system 900 and other devices attached to a network, such as other computer systems, or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or retrieving data by one or more computer system 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 925, that implement the various methods and techniques as described herein, and data storage 935, comprising various data accessible by program instructions 925. In one embodiment, program instructions 925 may include software elements of embodiments as described herein and as illustrated in the Figures. Data storage 935 may include data that may be used in embodiments. In other embodiments, other or different software elements and data may be included.

Those skilled in the art will appreciate that computer system 900 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more processors; and
one or more memories, wherein the one or more memories have stored thereon instructions, which when executed by the one or more processors of a provider network, cause the one or more processors to implement a stateful data processing service, wherein the stateful data processing service is configured to:
receive, from a client, a query for a database, wherein the query indicates table operations to be performed on one or more tables of a database;
select by the stateful data processing service, from among the table operations of the query to be performed and based on one or more criteria, at least one table operation of the query to be performed on at least one table of the database by a stateless data processing service instead of the stateful data processing service, wherein at least one remaining table operation of the received query is performed by the stateful data processing service, and wherein data of the at least one table is accessible to both the stateless data processing service and the stateful data processing service;
send an indication of the at least one table operation to a stateless data processing service;
receive one or more results from the stateless data processing service, wherein the one or more results are based on performance, by the stateless data processing service, of the at least one table operation on the at least one of the tables of the database; and
generate, for the client, a query result based at least on the one or more results.

2. The system as recited in claim 1, wherein to select, based on one or more criteria, at least one table operation from among the table operations to be performed, the stateful data processing service is further configured to:
determine that an amount of time to perform the at least one table operation by the stateless data processing service will be less than an amount of time to perform the at least one table operation by the stateful data processing service.

3. The system as recited in claim 1, wherein to select, based on one or more criteria, at least one table operation from among the table operations to be performed, the stateful data processing service is further configured to determine one or more of:
a size of a table to be scanned by the at least one table operation is above a threshold size, or
a number of requests to be made by the stateless data processing service to perform the at least one table operation is above a threshold number.

4. The system as recited in claim 1, wherein to select, based on one or more criteria, at least one table operation from among the table operations to be performed, the stateful data processing service is further configured to determine that:
no data of a table to be scanned by the at least one table operation is stored by the stateful data processing service, or
an amount of data of the table to be scanned by the at least one table operation that is stored by the stateful data processing service is less than a threshold amount.

5. The system as recited in claim 1, wherein to select, based on one or more criteria, at least one table operation from among the table operations to be performed, the stateful data processing service is further configured to determine that:
an amount of data returned by the at least one table operation is less than a threshold amount.

6. The system as recited in claim 1, wherein to select, based on one or more criteria, at least one table operation from among the table operations to be performed, the stateful data processing service is further configured to:
determine that compute resource usage to perform the at least one table operation is above a threshold amount.

7. The system as recited in claim 1, wherein at least a portion of the tables is stored by a data cache of the stateful data processing service, and wherein the stateful data processing service is further configured to:
perform another table operation on the data cache to generate another result, and wherein to generate the query result, the stateful data processing service is configured to generate the query result based at least on the one or more results and the other result.

8. A method, comprising:
performing, by a stateful data processing service implemented by a plurality of computing devices:
receiving, from a client, a query for a database, wherein the query indicates table operations to be performed on one or more tables of a database;
selecting by the stateful data processing service, from among the table operations of the query to be performed and based on one or more criteria, at least one table operation of the query to be performed on at least one table of the database by a stateless data processing service instead of the stateful data processing service, wherein at least one remaining table operation of the received query is performed by the stateful data processing service, and wherein data of the at least one table is accessible to both the stateless data processing service and the stateful data processing service;
sending an indication of the at least one table operation to a stateless data processing service;
receiving one or more results from the stateless data processing service, wherein the one or more results are based on performance, by the stateless data processing service, of the at least one table operation on the at least one of the tables of the database; and
generating, for the client, a query result based at least on the one or more results.

9. The method as recited in claim 8, wherein selecting, based on one or more criteria, at least one table operation from among the table operations to be performed comprises:
determining that an amount of time to perform the at least one table operation by the stateless data processing service will be less than an amount of time to perform the at least one table operation by the stateful data processing service.

10. The method as recited in claim 8, wherein selecting, based on one or more criteria, at least one table operation from among the table operations to be performed comprises determining one or more of:
a size of a table to be scanned by the at least one table operation is above a threshold size, or
a number of requests to be made by the stateless data processing service to perform the at least one table operation is above a threshold number.

11. The method as recited in claim 8, wherein selecting, based on one or more criteria, at least one table operation from among the table operations to be performed comprises determining that:
no data of a table to be scanned by the at least one table operation is stored by the stateful data processing service, or
an amount of data of the table to be scanned by the at least one table operation that is stored by the stateful data processing service is less than a threshold amount.

12. The method as recited in claim 8, wherein selecting, based on one or more criteria, at least one table operation from among the table operations to be performed comprises determining that:
an amount of data returned by the at least one table operation is less than a threshold amount.

13. The method as recited in claim 8, wherein selecting, based on one or more criteria, at least one table operation from among the table operations to be performed comprises:
determining that compute resource usage to perform the at least one table operation is above a threshold amount.

14. The method as recited in claim 8, wherein at least a portion of the tables is stored by a data cache of the stateful data processing service, and further comprising:
performing another table operation on the data cache to generate another result, and wherein generating the query result comprises generating the query result based at least on the one or more results and the other result.

15. One or more non-transitory computer-accessible storage media storing program instructions that when executed on or across one or more processors cause the one or more processors to implement a stateful data processing service to:

receive, from a client, a query for a database, wherein the query indicates table operations to be performed on one or more tables of a database;

select by the stateful data processing service, from among the table operations of the query to be performed and based on one or more criteria, at least one table operation of the query to be performed on at least one table of the database by a stateless data processing service instead of the stateful data processing service, wherein at least one remaining table operation of the received query is performed by the stateful data processing service, and wherein data of the at least one table is accessible to both the stateless data processing service and the stateful data processing service;

send an indication of the at least one table operation to a stateless data processing service;

receive one or more results from the stateless data processing service, wherein the one or more results are based on performance, by the stateless data processing service, of the at least one table operation on the at least one of the tables of the database; and generate, for the client, a query result based at least on the one or more results.

16. The one or more storage media as recited in claim 15, wherein to select, based on one or more criteria, at least one table operation from among the table operations to be performed, the program instructions when executed on or across the one or more processors further cause the one or more processors to:

determine that an amount of time to perform the at least one table operation by the stateless data processing service will be less than an amount of time to perform the at least one table operation by the stateful data processing service.

17. The one or more storage media as recited in claim 15, wherein to select, based on one or more criteria, at least one table operation from among the table operations to be performed, the program instructions when executed on or across the one or more processors further cause the one or more processors to determine one or more of:

a size of a table to be scanned by the at least one table operation is above a threshold size, or a number of requests to be made by the stateless data processing service to perform the at least one table operation is above a threshold number.

18. The one or more storage media as recited in claim 15, wherein to select, based on one or more criteria, at least one table operation from among the table operations to be performed, the program instructions when executed on or across the one or more processors further cause the one or more processors to determine that:

no data of a table to be scanned by the at least one table operation is stored by the stateful data processing service, or an amount of data of the table to be scanned by the at least one table operation that is stored by the stateful data processing service is less than a threshold amount.

19. The one or more storage media as recited in claim 15, wherein to select, based on one or more criteria, at least one table operation from among the table operations to be performed, the program instructions when executed on or across the one or more processors further cause the one or more processors to determine that:

an amount of data returned by the at least one table operation is less than a threshold amount.

20. The one or more storage media as recited in claim 15, wherein at least a portion of the tables is stored by a data cache of the stateful data processing service, and wherein the program instructions when executed on or across the one or more processors further cause the one or more processors to:

perform another table operation on the data cache to generate another result, and wherein to generate the query result, the stateful data processing service is configured to generate the query result based at least on the one or more results and the other result.

\* \* \* \* \*